US012595770B2

(12) United States Patent
Saito

(10) Patent No.: US 12,595,770 B2
(45) Date of Patent: Apr. 7, 2026

(54) VEHICLE

(71) Applicant: SUBARU CORPORATION, Tokyo (JP)

(72) Inventor: Takeshi Saito, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 19/236,104

(22) Filed: Jun. 12, 2025

(65) Prior Publication Data

US 2026/0028941 A1 Jan. 29, 2026

(30) Foreign Application Priority Data

Jul. 26, 2024 (JP) ................................ 2024-121709

(51) Int. Cl.
*F04D 13/02* (2006.01)
*F02D 13/02* (2006.01)

(52) U.S. Cl.
CPC .. *F02D 13/0261* (2013.01); *F02D 2013/0292* (2013.01)

(58) Field of Classification Search
CPC ............ F02D 13/0261; F02D 13/0215; F02D 13/0207; F02D 13/0238; F01N 9/00; F02N 9/005; Y02T 10/12; Y02T 10/40
See application file for complete search history.

(56) References Cited

U.S. PATENT DOCUMENTS

| | | | | |
|---|---|---|---|---|
| 5,303,158 A * | 4/1994 | Kuroda | G01M 15/11 | 701/111 |
| 5,644,073 A * | 7/1997 | Matsuno | F02D 13/0215 | 701/99 |
| 10,830,158 B2 * | 11/2020 | Iwata | F02D 41/04 | |
| 2004/0230363 A1 * | 11/2004 | Kurt-Elli | G01M 15/12 | 701/100 |
| 2011/0314796 A1 * | 12/2011 | Nakamura | G01N 15/0656 | 60/276 |

FOREIGN PATENT DOCUMENTS

| | | |
|---|---|---|
| JP | H08-254154 A | 10/1996 |
| JP | H08-278191 A | 10/1996 |

* cited by examiner

*Primary Examiner* — Dapinder Singh
(74) *Attorney, Agent, or Firm* — Rimon P.C.

(57) ABSTRACT

A vehicle includes an engine, an exhaust flow passage, an air-fuel ratio sensor, and a control apparatus. The exhaust flow passage is configured to communicate with the engine. The air-fuel ratio sensor is provided in the exhaust flow passage. The control apparatus includes one or more processors, and one or more memories coupled to the one or more processors. The one or more processors are configured to: cause backflow of gas inside the exhaust flow passage while the vehicle is stopped; and diagnose a state of adhesion of oil inside the exhaust flow passage, based on a result of detection performed by the air-fuel ratio sensor in causing the backflow of the gas inside the exhaust flow passage.

8 Claims, 4 Drawing Sheets

VEHICLE

CROSS-REFERENCE TO RELATED APPLICATIONS

The present application claims priority from Japanese Patent Application No. 2024-121709 filed on Jul. 26, 2024, the entire contents of which are hereby incorporated by reference.

BACKGROUND

The disclosure relates to a vehicle.

A manufacturing process of an engine for a vehicle, such as an automobile, involves a completion inspection. The completion inspection includes a practical test performed on all the engines after completion of assembly. The practical test is also referred to as a firing test. For example, reference is made to Japanese Unexamined Patent Application Publication (JP-A) Nos. H08-254154 and H08-278191.

The manufacturing process of the vehicle uses an industrial oil upon, for example, molding, processing, and cleaning of a metal member. Accordingly, the oil can remain inside an exhaust flow passage of the vehicle. When the engine is driven with the oil adhering to the inside of the exhaust flow passage, particulate matter derived from the oil can be generated inside the exhaust flow passage.

To address this, in addition to the completion inspection, a removal process that removes the oil from the inside of the exhaust flow passage is typically executed on all the vehicles before shipment.

SUMMARY

An aspect of the disclosure provides a vehicle including an engine, an exhaust flow passage, an air-fuel ratio sensor, and a control apparatus. The exhaust flow passage is configured to communicate with the engine. The air-fuel ratio sensor is provided in the exhaust flow passage. The control apparatus includes one or more processors, and one or more memories coupled to the one or more processors. The one or more processors are configured to: cause backflow of gas inside the exhaust flow passage while the vehicle is stopped; and diagnose a state of adhesion of oil inside the exhaust flow passage, based on a result of detection performed by the air-fuel ratio sensor in causing the backflow of the gas inside the exhaust flow passage.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
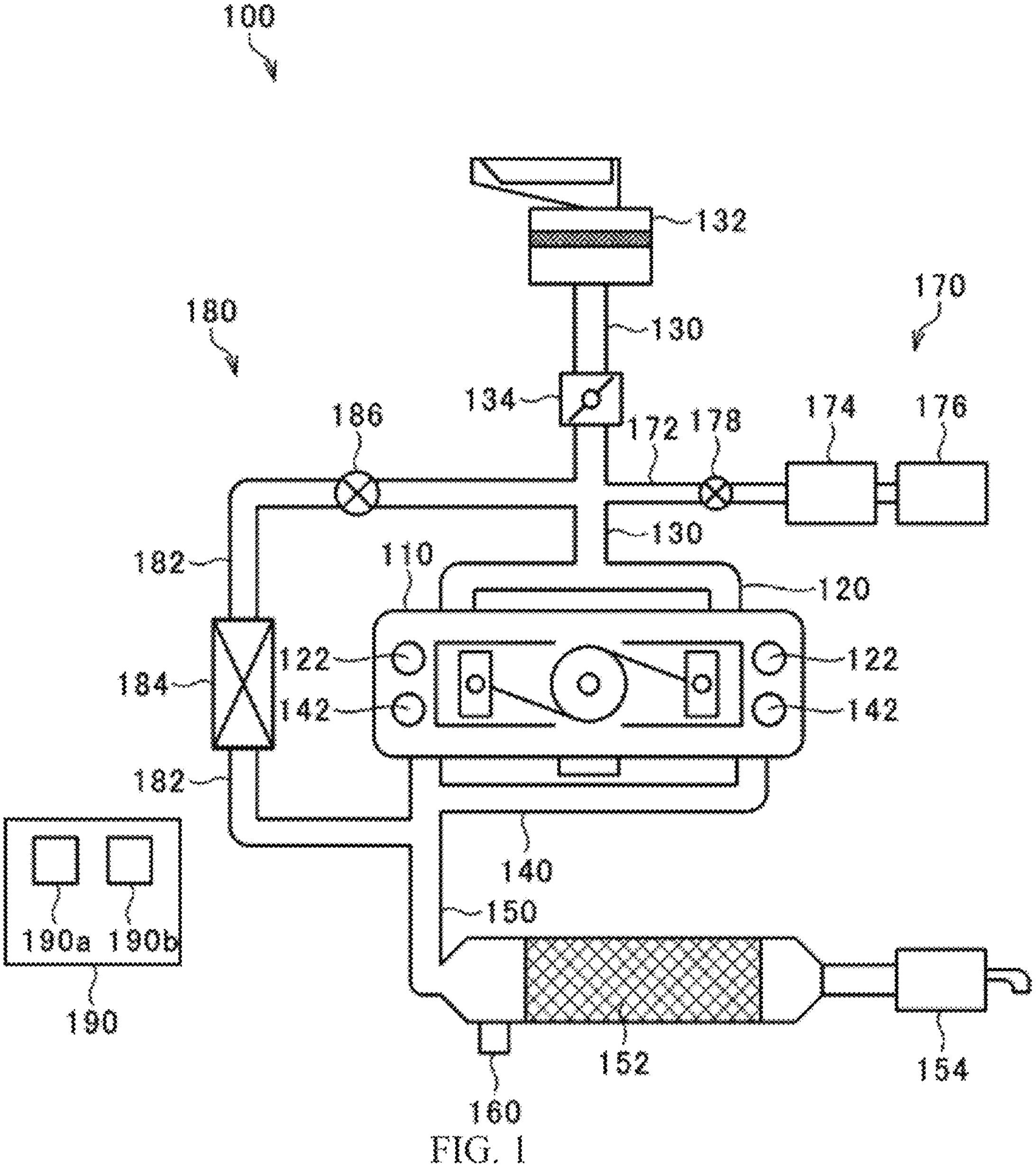
FIG. 1 is a schematic diagram illustrating an exemplary configuration of a vehicle according to one example embodiment of the disclosure.

An amount of adhesion of oil inside an exhaust flow passage differs for each vehicle. Accordingly, if a removal process that removes the oil is executed on all the vehicles before shipment as in existing techniques disclosed in JP-A Nos. H08-254154 and H08-278191, effort, time, and cost necessary for the removal process can be increased. In addition, driving an engine and thus increasing temperature of exhaust gas to burn off the oil as the removal process can unnecessarily prolong the operation time of the engine before the shipment. Therefore, what is desired is development of a technique that makes it possible to easily diagnose a state of adhesion of the oil inside the exhaust flow passage.

It is desirable to provide a vehicle that makes it possible to easily diagnose a state of adhesion of oil inside an exhaust flow passage.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

1. CONFIGURATION OF VEHICLE

First, an exemplary configuration of a vehicle 100 according to an example embodiment of the disclosure will be described with reference to FIG. 1. FIG. 1 is a schematic diagram illustrating the exemplary configuration of the vehicle 100 according to the present example embodiment of the disclosure. Referring to FIG. 1, the vehicle 100 includes an engine 110, an exhaust flow passage 150, an air-fuel ratio sensor 160, and a control apparatus 190. The vehicle 100 may include an intake manifold 120, an intake flow passage 130, and an exhaust manifold 140.

The engine 110 may be a drive source of the vehicle 100. In the present example embodiment, the vehicle 100 may be an engine vehicle. The engine 110 may be a gasoline engine or a diesel engine. In some embodiments, the vehicle 100 may be a hybrid vehicle including, in addition to the engine 110, a motor as the drive source. The engine 110 may include components such as a plurality of cylinders.

The intake manifold 120 may be coupled to an intake port of each cylinder of the engine 110. The intake port may be opened and closed by an intake valve 122.

The intake flow passage 130 may communicate with the engine 110 through the intake manifold 120. The intake flow passage 130 may be coupled to a collector of the intake manifold 120. In some embodiments, the intake flow passage 130 may include an air cleaner 132. The air cleaner 132 may remove foreign matter contained in the air taken in the intake flow passage 130. The intake flow passage 130 may include a throttle valve 134 provided downstream of the air cleaner 132. The throttle valve 134 may regulate a flow rate of the intake air to be sent to the engine 110 through the intake flow passage 130. The flow rate of the intake air to be sent to the engine 110 may be varied depending on an opening degree of the throttle valve 134.

The exhaust manifold 140 may be coupled to an exhaust port of each cylinder of the engine 110. The exhaust port may be opened and closed by an exhaust valve 142.

The exhaust flow passage 150 may communicate with the engine 110 through the exhaust manifold 140. The exhaust flow passage 150 may be coupled to a collector of the exhaust manifold 140. In some embodiments, the exhaust flow passage 150 may include a purifier 152. The purifier 152 may purify exhaust gas discharged from the engine 110. In some embodiments, the purifier 152 may include one or both of a catalyst and a filter. In some embodiments, the catalyst may include one or more of an oxidation catalyst, a three-way catalyst, and a NOx storage-reduction catalyst. The filter may capture particulate matter, such as soot, contained in the exhaust gas. Non-limiting examples of the filter may include a gasoline particulate filter (GPF) and a diesel particulate filter (DPF). The exhaust gas purified by the purifier 152 may be discharged to the outside through a muffler 154.

The air-fuel ratio sensor 160 is provided in the exhaust flow passage 150. In some embodiments, the air-fuel ratio sensor 160 may be provided at a location, in the exhaust flow passage 150, closer to the engine 110 with respect to the purifier 152. The air-fuel ratio sensor 160 may detect an oxygen concentration in the exhaust gas. Non-limiting examples of the air-fuel ratio sensor 160 may include an air-fuel ratio (A/F) sensor and an oxygen ($O_2$) sensor.

In some embodiments, the vehicle 100 may include an evaporative fuel processor 170. The evaporative fuel processor 170 may also be referred to as an evaporative system. The evaporative fuel processor 170 may prevent a fuel gas evaporated from equipment such as a fuel tank provided in the vehicle 100 from being released to the atmosphere. In some embodiments, the evaporative fuel processor 170 may include a first flow passage 172, a canister 174, a suction device 176, and a first opening degree adjustment valve 178.

The first flow passage 172 may be coupled to the intake flow passage 130. The canister 174 may be provided in the first flow passage 172. The canister 174 may store the fuel gas evaporated from equipment such as the fuel tank. The canister 174 may include a substance such as activated carbon.

The suction device 176 may be provided at a location, in the first flow passage 172, farther from the intake flow passage 130 with respect to the canister 174. The suction device 176 may suction the gas from the intake flow passage 130 toward the first flow passage 172. In some embodiments, the suction device 176 may be included in an evaporative leak check module (ELCM). The ELCM may be configured to check a leakage of the fuel gas from the fuel tank. The suction device 176 may include a component such as a pump.

The first opening degree adjustment valve 178 may be provided at a location, in the first flow passage 172, closer to the intake flow passage 130 with respect to the canister 174. The first opening degree adjustment valve 178 may regulate a cross-sectional area of the first flow passage 172. In some embodiments, the first opening degree adjustment valve 178 may be a solenoid valve.

In some embodiments, the vehicle 100 may include an exhaust gas recirculation (EGR) device 180. The EGR device 180 may reduce a nitrogen oxide in the exhaust gas by recirculating the exhaust gas to the engine 110 through the intake flow passage 130. In some embodiments, the EGR device 180 may include a second flow passage 182, an EGR cooler 184, and a second opening degree adjustment valve 186.

The second flow passage 182 may cause the exhaust flow passage 150 and the intake flow passage 130 to communicate with each other. In some embodiments, the second flow passage 182 may be coupled to the exhaust flow passage 150 at a location closer to the exhaust manifold 140 with respect to the purifier 152. The second flow passage 182 may also be coupled to the intake flow passage 130 at a location closer to the intake manifold 120 with respect to the throttle valve 134.

The EGR cooler 184 may be provided in the second flow passage 182. The EGR cooler 184 may cool the exhaust gas flowing through the second flow passage 182.

The second opening degree adjustment valve 186 may be provided in the second flow passage 182. In some embodiments, the second opening degree adjustment valve 186 may be provided at a location, in the second flow passage 182, closer to the intake flow passage 130 with respect to the EGR cooler 184. The second opening degree adjustment valve 186 may regulate a cross-sectional area of the second flow passage 182.

The control apparatus 190 includes one or more processors 190*a*, and one or more memories 190*b* coupled to the one or more processors 190*a*. In some embodiments, the one or more processors 190*a* may include a central processing unit (CPU). Non-limiting examples of the one or more memories 190*b* may include a read-only memory (ROM) and a random-access memory (RAM). The ROM may be a storage device that stores data such as programs or operation parameters to be used by the CPU. The RAM may be a storage device that temporarily stores data such as variables or parameters to be used in a process to be executed by the CPU.

The control apparatus 190 may communicate with each device of the vehicle 100, such as the engine 110, the throttle valve 134, the air-fuel ratio sensor 160, the suction device 176, the first opening degree adjustment valve 178, or the second opening degree adjustment valve 186. The control apparatus 190 and each device may communicate with each other by a method such as controller area network (CAN) communication.

Figure 2:
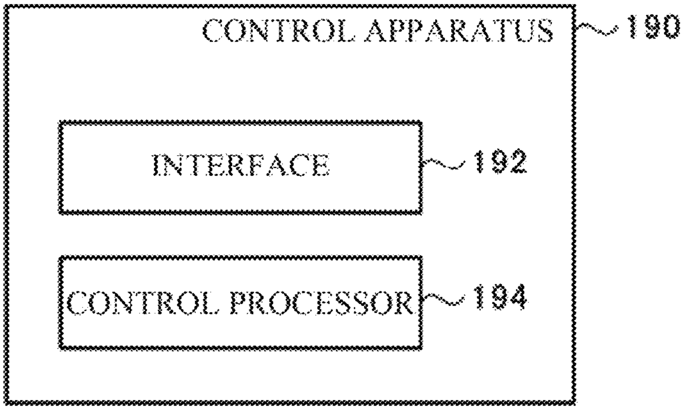
FIG. 2 is a block diagram illustrating an exemplary configuration of a control apparatus illustrated in FIG. 1.

FIG. 2 is a block diagram illustrating an exemplary configuration of the control apparatus 190 according to the present example embodiment. Referring to FIG. 2, the control apparatus 190 according to the present example embodiment may include an interface 192 and a control processor 194. Various processes including later-described processes to be performed by one or both of the interface 192 and the control processor 194 may be executed by the one or more processors 190*a*. In one example, the various processes may be executed when the one or more processors 190*a* execute programs stored in the one or more memories 190*b*.

The interface 192 may acquire various kinds of data to be used for the processes to be executed by the control processor 194, and output the data to the control processor 194. In some embodiments, the interface 192 may acquire data from the air-fuel ratio sensor 160.

The control processor 194 may control an operation of each device of the vehicle 100. In the present example embodiment, the control processor 194 executes a backflow process that causes backflow of the gas inside the exhaust flow passage 150 while the vehicle 100 is stopped. The control processor 194 further executes a diagnosis process that diagnoses a state of adhesion of oil inside the exhaust flow passage 150, based on a result of the detection performed by the air-fuel ratio sensor 160 in executing the backflow process. In some embodiments, the control processor 194 may execute a removal process that removes the oil inside the exhaust flow passage 150, based on a result of the diagnosis process. The details of the backflow process, the diagnosis process, and the removal process to be executed by the control processor 194 will be described later. As used herein, the term "oil" may refer to one or both of oil and fat.

In some embodiments, a configuration of the control apparatus 190 may be performed by a plurality of devices. In some embodiments, a plurality of configurations of the control apparatus 190 may be achieved by a single device. In some embodiments where the configuration of the control apparatus 190 is performed by the devices, the devices may be coupled to each other via a communication bus such as the CAN.

2. OPERATION OF CONTROL APPARATUS

Next, an exemplary operation of the control apparatus 190 according to the present example embodiment of the disclosure will be described with reference to FIG. 3.

Figure 3:
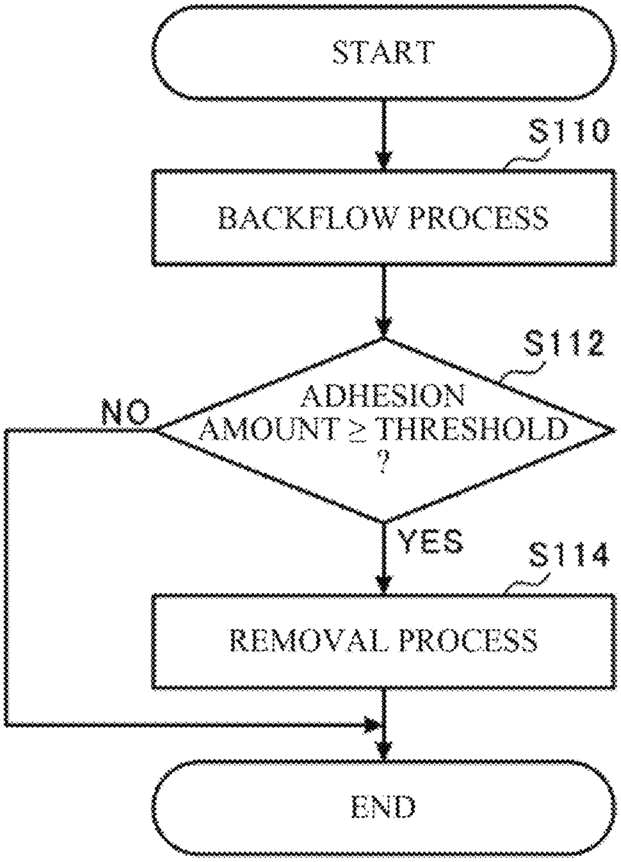
FIG. 3 is a flowchart illustrating an exemplary flow of processes to be executed by the control apparatus illustrated in FIGS. 1 and 2.

FIG. 3 is a flowchart illustrating an exemplary flow of processes to be executed by the control apparatus 190 according to the present example embodiment. In some embodiments, the control flow illustrated in FIG. 3 may be started: during a stop of the vehicle 100 after start-up traveling performed before shipment of the vehicle 100; during a stop of the vehicle 100 before the start-up traveling performed before the shipment of the vehicle 100; or during a stop of the vehicle 100 after the new exhaust flow passage 150 is attached to the vehicle 100.

When the control flow illustrated in FIG. 3 is started, in step S110, the control processor 194 may first execute the backflow process that causes the backflow of the gas inside the exhaust flow passage 150 while the vehicle 100 is stopped. In some embodiments, the control processor 194 may cause the backflow of the gas inside the exhaust flow passage 150 by opening the first opening degree adjustment valve 178 of the evaporative fuel processor 170 and driving the suction device 176 in the backflow process. In general, the intake valve 122 and the exhaust valve 142 may be closed when the vehicle 100 is stopped. Accordingly, in the backflow process, the control processor 194 may open the second opening degree adjustment valve 186 of the EGR device 180. The suction device 176 may thus cause the gas inside the exhaust flow passage 150 and outside air to sequentially flow through the exhaust flow passage 150, the air-fuel ratio sensor 160, the second flow passage 182, the intake flow passage 130, the first flow passage 172, and the canister 174. In some embodiments, the control processor 194 may close the throttle valve 134 in the backflow process. This configuration allows the control processor 194 to efficiently cause the backflow of the gas.

Thereafter, in step S112, the control processor 194 may execute the diagnosis process that diagnoses the state of adhesion of the oil inside the exhaust flow passage 150, based on the result of the detection performed by the air-fuel ratio sensor 160 in executing the backflow process. In some embodiments, the interface 192 may acquire a detection value of the air-fuel ratio sensor 160. Thereafter, the control processor 194 may calculate the amount of adhesion of the oil inside the exhaust flow passage 150, based on the detection value of the air-fuel ratio sensor 160.

An industrial oil that adheres to the inside of the exhaust flow passage 150 in the manufacturing process of the exhaust flow passage 150 may be detectable by the air-fuel ratio sensor 160 in a similar manner to a fuel of the vehicle 100. When the industrial oil adheres to the inside of the exhaust flow passage 150, an excess air ratio ($\lambda$) detected by the air-fuel ratio sensor 160 may be less than 1.0. In other words, the excess air ratio detected by the air-fuel ratio sensor 160 may decrease as an amount of adhesion of the industrial oil inside the exhaust flow passage 150 increases.

The control processor 194 may determine whether the calculated amount of adhesion of the oil is greater than or equal to a threshold. In some embodiments, the threshold may be determined based on the amount of the oil at which an amount of particulate matter derived from the oil is less than a value specified by exhaust gas regulations.

If determining that the calculated amount of adhesion of the oil is greater than or equal to the threshold (step S112: YES), the control processor 194 may end the backflow process and the diagnosis process, and cause the flow to proceed to step S114. If determining that the calculated amount of adhesion of the oil is not greater than or equal to the threshold, that is, is less than the threshold (step S112: NO), the control processor 194 may end the backflow process and the diagnosis process, and end the control flow illustrated in FIG. 3.

In step S114, the control processor 194 may execute the removal process that removes the oil inside the exhaust flow passage 150. In some embodiments, in the removal process, the control processor 194 may remove the oil inside the exhaust flow passage 150 with the exhaust gas discharged from the engine 110. In some embodiments, the control processor 194 may volatilize or burn off the oil inside the exhaust flow passage 150 by operating the engine 110 at a rotational speed higher than that in a normal operation and thereby increasing temperature of the exhaust gas. At this time, the control processor 194 may cause the engine 110 to perform lean burn. This may allow the control processor 194 to remove the oil inside the exhaust flow passage 150. In some embodiments, the control processor 194 may adjust one or more of factors including the temperature of the exhaust gas, an air-fuel ratio of the engine 110, and the execution time of the removal process, in consideration of the amount of adhesion of the oil.

The control processor 194 may end the control flow illustrated in FIG. 3 when step S114 is completed.

3. EXAMPLE EFFECTS OF VEHICLE

Next, some example effects of the vehicle 100 according to the present example embodiment of the disclosure will be described.

The vehicle 100 according to the present example embodiment includes the engine 110, the exhaust flow passage 150, the air-fuel ratio sensor 160, and the control apparatus 190. The exhaust flow passage 150 is configured to communicate with the engine 110. The air-fuel ratio sensor 160 is provided in the exhaust flow passage 150. The control apparatus 190 includes the one or more processors 190*a*, and the one or more memories 190*b* coupled to the one or more processors 190*a*. The one or more processors 190*a* are configured to: execute the backflow process that causes the backflow of the gas inside the exhaust flow passage 150 while the vehicle 100 is stopped; and execute the diagnosis process that diagnoses the state of adhesion of the oil inside the exhaust flow passage 150, based on the result of the detection performed by the air-fuel ratio sensor 160 in executing the backflow process. The vehicle 100 according to the present example embodiment allows the gas including the component volatilized from the oil adhering to the inside of the exhaust flow passage 150 to be transported to the air-fuel ratio sensor 160 by causing the backflow of the gas through the backflow process. As described above, this enables the industrial oil that adheres to the inside of the exhaust flow passage 150 in the manufacturing process of the exhaust flow passage 150 to be detected by the air-fuel ratio sensor 160 in a similar manner to the fuel of the vehicle 100. Accordingly, the vehicle 100 according to the present example embodiment allows for diagnosing the state of adhesion of the oil with the air-fuel ratio sensor 160 across an entire area of the exhaust flow passage 150 from the air-fuel ratio sensor 160 to an outlet of the muffler 154. Therefore, the vehicle 100 according to the present example embodiment helps to easily diagnose the state of adhesion of the oil inside the exhaust flow passage 150 by a simple operation of causing the backflow of the gas inside the exhaust flow passage 150.

In some embodiments, the one or more processors **190*a* may be configured to execute the removal process that removes the oil inside the exhaust flow passage 150, based on the result of the diagnosis process. Such a configuration allows the removal process to be executed on the vehicle 100 of which the amount of adhesion of the oil inside the exhaust flow passage 150 is greater than or equal to the threshold, alone. In other words, the configuration allows the removal process to be unexecuted on the vehicle 100 of which the amount of adhesion of the oil inside the exhaust flow passage 150 is less than the threshold. The configuration helps to reduce effort, time, and cost necessary for the removal process, as compared with the existing techniques that execute the removal process on all the vehicles 100 before the shipment. The configuration further helps to prevent a travel distance before the shipment of the vehicle 100** subjected to no removal process from being unnecessarily prolonged.

In some embodiments, the vehicle 100 may include the intake flow passage 130, the first flow passage 172, the first opening degree adjustment valve 178, and the suction device 176. The intake flow passage 130 may be configured to communicate with the engine 110. The first flow passage 172 may be coupled to the intake flow passage 130 and include the canister 174. The first opening degree adjustment valve 178 may be provided at the location, in the first flow passage 172, closer to the intake flow passage 130 with respect to the canister 174. The suction device 176 may be provided at the location, in the first flow passage 172, farther from the intake flow passage 130 with respect to the canister 174. The suction device 176 may be configured to suction the gas from the intake flow passage 130 toward the first flow passage 172. The one or more processors **190*a* may be configured to cause the backflow of the gas inside the exhaust flow passage 150 by opening the first opening degree adjustment valve 178 and driving the suction device 176 in the backflow process. Such a configuration of the vehicle 100** helps to execute the backflow process by the simple operation.

4. MODIFICATION EXAMPLES

The configuration of the vehicle 100 has been described above with reference to FIG. 1; however, according to any modification example of the disclosure, a vehicle having a configuration other than the configuration illustrated in FIG. 1 may be provided. In the modification example, a part of the components of the vehicle 100 described above may be deleted or changed as appropriate, or one or more components may be added to the vehicle 100 as appropriate.

4.1. First Modification Example

Figure 4:
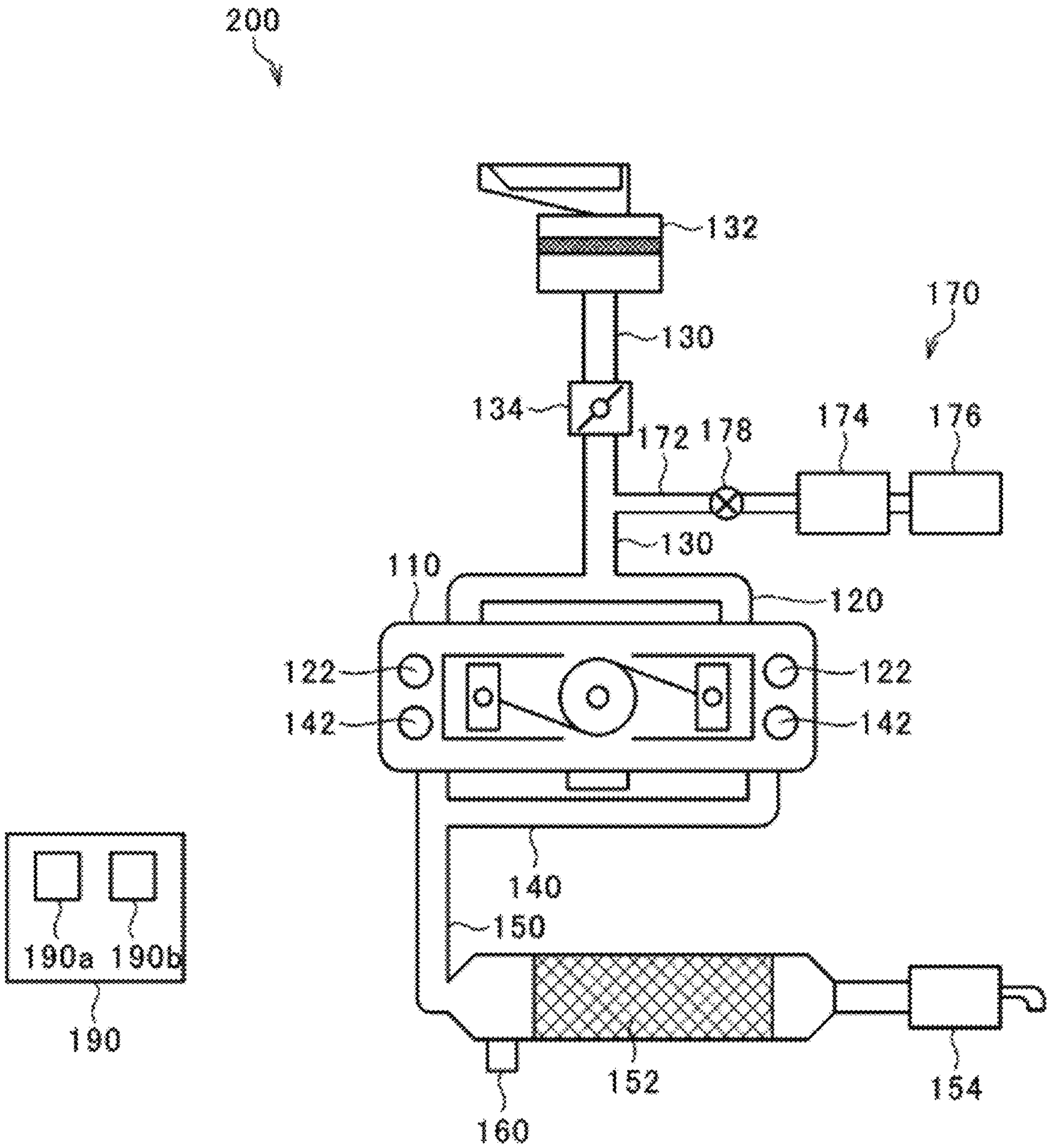
FIG. 4 is a schematic diagram illustrating an exemplary configuration of a vehicle according to one modification example.

The vehicle according to any modification example of the disclosure may have a configuration illustrated in FIG. 4. FIG. 4 is a schematic diagram illustrating an exemplary configuration of a vehicle 200 according to a first modification example. Referring to FIG. 4, the vehicle 200 may differ from the vehicle 100 described above in that the vehicle 200 does not include the EGR device 180. Note that components substantially the same as those of the vehicle 100 described above are denoted by the same reference numerals, and will not be described in detail below.

Upon stopping the vehicle 200 illustrated in FIG. 4 before the backflow process, the control processor 194 may stop the engine 110 in a valve-overlap state in which both the intake valve 122 and the exhaust valve 142 of at least one of the cylinders of the engine 110 are open. In some embodiments, the control processor 194 may control the engine 110 to be in the valve-overlap state upon stopping the vehicle 200 before the start of the control flow illustrated in FIG. 3. In some embodiments, the control processor 194 may stop the engine 110 in the valve-overlap state by controlling a rotation angle of the engine 110 to be a rotation angle that produces the valve-overlap state. The control processor 194 may further open the first opening degree adjustment valve 178 and drive the suction device 176 while the engine 110 is controlled to be in the valve-overlap state in the backflow process. The suction device 176 may thus cause the gas inside the exhaust flow passage 150 and the outside air to sequentially flow through the exhaust flow passage 150, the air-fuel ratio sensor 160, the exhaust manifold 140, the engine 110, the intake manifold 120, the intake flow passage 130, the first flow passage 172, and the canister 174. In some embodiments, the control processor 194 may close the throttle valve 134 in the backflow process. This configuration allows the control processor 194 to efficiently cause the backflow of the gas.

Such a configuration of the vehicle 200 according to the first modification example helps to execute the backflow process by the simple operation.

4.2. Second Modification Example

Figure 5:
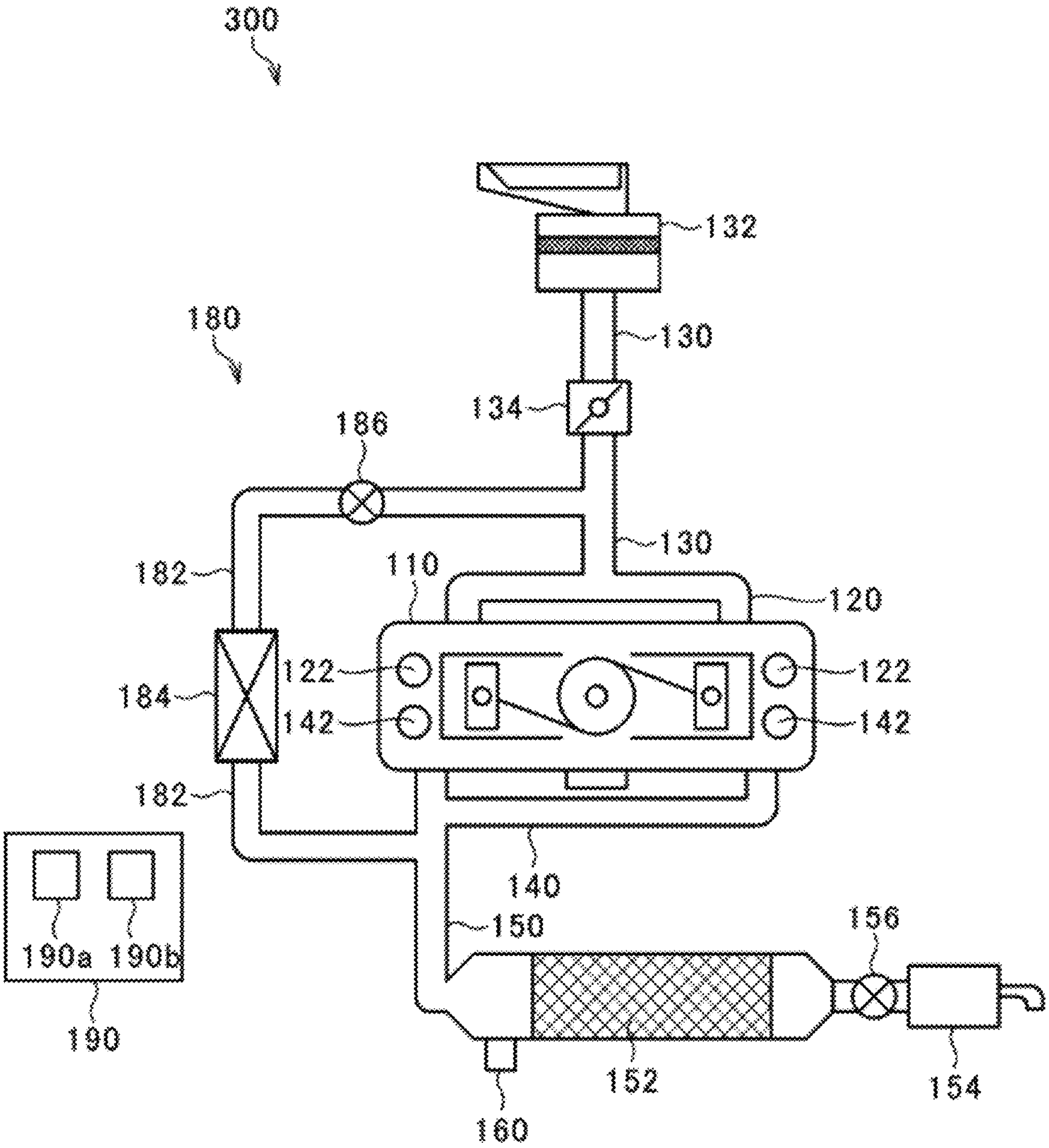
FIG. 5 is a schematic diagram illustrating an exemplary configuration of a vehicle according to one modification example.

The vehicle according to any modification example of the disclosure may have a configuration illustrated in FIG. 5. FIG. 5 is a schematic diagram illustrating an exemplary configuration of a vehicle 300 according to a second modification example. Referring to FIG. 5, the vehicle 300 may differ from the vehicle 100 described above in that the vehicle 300 includes an exhaust-flow-passage valve 156 and does not include the evaporative fuel processor 170. Note that components substantially the same as those of the vehicle 100 described above are denoted by the same reference numerals, and will not be described in detail below.

As illustrated in FIG. 5, the exhaust-flow-passage valve 156 may be provided downstream of the air-fuel ratio sensor 160 in the exhaust flow passage 150. In some embodiments, the exhaust-flow-passage valve 156 may be provided between the purifier 152 and the muffler 154 in the exhaust flow passage 150. The exhaust-flow-passage valve 156 may open and close the exhaust flow passage 150.

Upon stopping the vehicle 300 illustrated in FIG. 5 before the backflow process, the control processor 194 of the vehicle 300 may close the exhaust-flow-passage valve 156. In some embodiments, the control processor 194 may close the exhaust-flow-passage valve 156 upon stopping the vehicle 300 before the start of the control flow illustrated in FIG. 3. The control processor 194 may further cause the backflow of the gas inside the exhaust flow passage 150 by opening the second opening degree adjustment valve 186 while the exhaust-flow-passage valve 156 is closed in the backflow process. In the second modification example, upon stopping the vehicle 300, the control processor 194 may close the exhaust-flow-passage valve 156 while the engine 110 is operating to thereby fill the exhaust flow passage 150 with the exhaust gas, increasing pressure inside the exhaust flow passage 150. In some embodiments, the control processor 194 may cause the engine 110 to perform the lean burn in this operation. This helps to perform a highly accurate detection of the oil with the air-fuel ratio sensor 160. The control processor 194 may stop the engine 110 when the pressure inside the exhaust flow passage 150 becomes higher than atmospheric pressure.

After stopping the engine 110, the control processor 194 may open the second opening degree adjustment valve 186 while the exhaust-flow-passage valve 156 is closed. In some embodiments, the control processor 194 may open the throttle valve 134 in this operation. This may generate differential pressure between the pressure inside the exhaust flow passage 150 and pressure inside the intake flow passage 130 (i.e., the atmospheric pressure) to thereby cause the exhaust gas inside the exhaust flow passage 150 to sequentially flow through the exhaust flow passage 150, the air-fuel ratio sensor 160, the second flow passage 182, and the intake flow passage 130.

Such a configuration of the vehicle 300 according to the second modification example helps to execute the backflow process by the simple operation.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In some embodiments, the processes described herein with reference to the flowchart may not necessarily be executed in the order illustrated in the flowchart. In some embodiments, one or more processing steps may be added. In some embodiments, a part of the processing steps in the flowchart may be unexecuted.

In the foregoing example embodiment, when the amount of adhesion of the oil is greater than or equal to the threshold, the one or more processors 190*a* may execute the removal process; however, even when the amount of adhesion of the oil is greater than or equal to the threshold, the one or more processors 190*a* may refrain from executing the removal process. In some embodiments, when the amount of adhesion of the oil is greater than or equal to the threshold, an operator may remove the oil inside the exhaust flow passage 150.

In the foregoing example embodiment, the one or more processors 190*a* may estimate the amount of adhesion of the oil inside the exhaust flow passage 150, based on the detection value of the air-fuel ratio sensor 160; however, the one or more processors 190*a* may refrain from estimating the amount of adhesion of the oil inside the exhaust flow passage 150, based on the detection value of the air-fuel ratio sensor 160. In some embodiments, the one or more processors 190*a* may directly determine presence or absence of adhesion of the oil, based on the detection value of the air-fuel ratio sensor 160. In some embodiments, the one or more processors 190*a* may directly determine whether the amount of adhesion of the oil is greater than or equal to the threshold, based on the detection value of the air-fuel ratio sensor 160.

Although the disclosure has been described hereinabove in terms of the example embodiment and modification examples, the disclosure is not limited thereto. It should be appreciated that variations may be made in the described example embodiment and modification examples by those skilled in the art without departing from the scope of the disclosure as defined by the following claims.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a", "an", and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. does not denote any order or importance, but rather the terms first, second, etc. are used to distinguish one element from another.

The term "substantially", "approximately", "about", and its variants having a similar meaning thereto are defined as being largely but not necessarily wholly what is specified as understood by one of ordinary skill in the art.

The term "disposed on/provided on/formed on" and its variants having a similar meaning thereto as used herein refer to elements disposed directly in contact with each other or indirectly by having intervening structures therebetween.

The control apparatus 190 illustrated in FIGS. 1, 2, 4, and 5 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control apparatus 190. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the control apparatus 190 illustrated in FIGS. 1, 2, 4, and 5.

The invention claimed is:

1. A vehicle comprising:

an engine;

an exhaust flow passage configured to communicate with the engine;

an air-fuel ratio sensor provided in the exhaust flow passage; and a control apparatus comprising one or more processors, and one or more memories coupled to the one or more processors, wherein the one or more processors are configured to cause backflow of gas inside the exhaust flow passage while the vehicle is stopped, and diagnose a state of adhesion of oil inside the exhaust flow passage, based on a result of detection performed by the air-fuel ratio sensor in causing the backflow of the gas inside the exhaust flow passage.

2. The vehicle according to claim 1, wherein the one or more processors are configured to remove the oil inside the exhaust flow passage, based on a result of diagnosing the state of the adhesion of the oil inside the exhaust flow passage.

3. The vehicle according to claim 2, further comprising:

an intake flow passage configured to communicate with the engine;

a first flow passage coupled to the intake flow passage and comprising a canister;

a first opening degree adjustment valve provided at a first location, in the first flow passage, closer to the intake flow passage with respect to the canister; and a suction device provided at a second location, in the first flow passage, opposite to the first location and farther from the intake flow passage with respect to the canister, the suction device being configured to suction the gas from the intake flow passage toward the first flow passage, wherein the one or more processors are configured to cause the backflow of the gas inside the exhaust flow passage by opening the first opening degree adjustment valve and driving the suction device.

4. The vehicle according to claim 3, wherein the one or more processors are configured to cause the backflow of the gas inside the exhaust flow passage by opening the first opening degree adjustment valve and driving the suction device while the engine is controlled to be in a valve-overlap state in which both an intake valve and an exhaust valve of at least one cylinder of the engine are open.

5. The vehicle according to claim 2, further comprising:

an intake flow passage configured to communicate with the engine;

a second flow passage configured to cause the exhaust flow passage and the intake flow passage to communicate with each other;

a second opening degree adjustment valve provided in the second flow passage; and an exhaust-flow-passage valve provided downstream of the air-fuel ratio sensor in the exhaust flow passage, wherein the one or more processors are configured to cause the backflow of the gas inside the exhaust flow passage by opening the second opening degree adjustment valve while the exhaust-flow-passage valve is closed.

6. The vehicle according to claim 1, further comprising:

an intake flow passage configured to communicate with the engine;

a first flow passage coupled to the intake flow passage and comprising a canister;

a first opening degree adjustment valve provided at a first location, in the first flow passage, closer to the intake flow passage with respect to the canister; and a suction device provided at a second location, in the first flow passage, opposite to the first location and farther from the intake flow passage with respect to the canister, the suction device being configured to suction the gas from the intake flow passage toward the first flow passage, wherein the one or more processors are configured to cause the backflow of the gas inside the exhaust flow passage by opening the first opening degree adjustment valve and driving the suction device.

7. The vehicle according to claim 6, wherein the one or more processors are configured to cause the backflow of the gas inside the exhaust flow passage by opening the first opening degree adjustment valve and driving the suction device while the engine is controlled to be in a valve-overlap state in which both an intake valve and an exhaust valve of at least one cylinder of the engine are open.

8. The vehicle according to claim 1, further comprising:

an intake flow passage configured to communicate with the engine;

a second flow passage configured to cause the exhaust flow passage and the intake flow passage to communicate with each other;

a second opening degree adjustment valve provided in the second flow passage; and an exhaust-flow-passage valve provided downstream of the air-fuel ratio sensor in the exhaust flow passage, wherein the one or more processors are configured to cause the backflow of the gas inside the exhaust flow passage by opening the second opening degree adjustment valve while the exhaust-flow-passage valve is closed.

* * * * *